G. J. HENRY, Jr.
METHOD AND APPARATUS FOR CONTROLLING FLUID SUPPLY PRESSURES.
APPLICATION FILED AUG. 30, 1910.
1,117,671.
Patented Nov. 17, 1914.
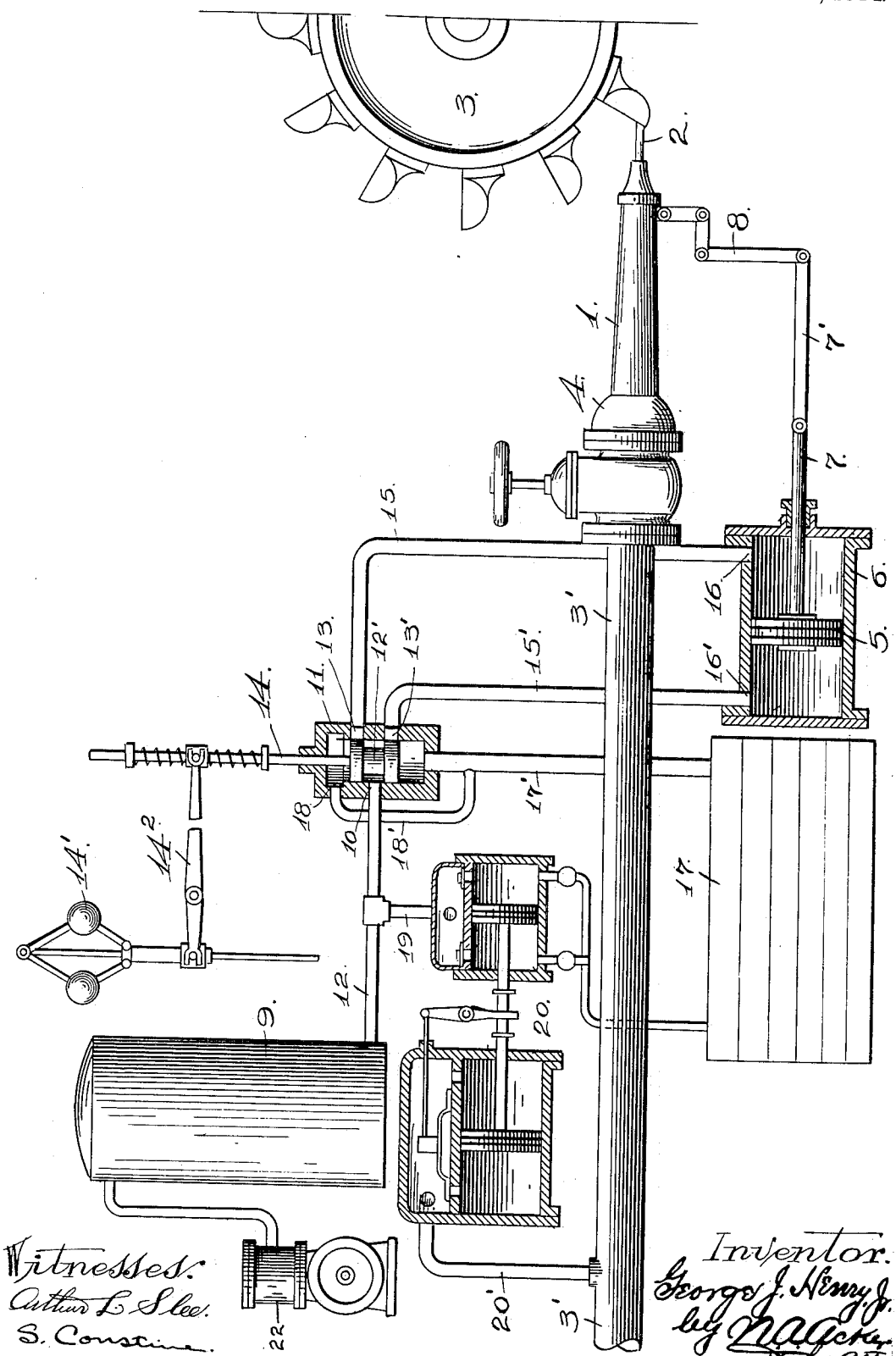
Inventor.
George J. Henry Jr.
by N. A. Acker
his atty.
Witnesses:
Arthur L. Slee
S. Constine

UNITED STATES PATENT OFFICE.

GEORGE J. HENRY, JR., OF SAN FRANCISCO, CALIFORNIA.

METHOD AND APPARATUS FOR CONTROLLING FLUID-SUPPLY PRESSURES.

1,117,671.	Specification of Letters Patent.	Patented Nov. 17, 1914.

Application filed August 30, 1910. Serial No. 579,780.

*To all whom it may concern:*

Be it known that I, GEORGE J. HENRY, Jr., a citizen of the United States, residing at the city and county of San Francisco and State of California, have invented certain new and useful Improvements in Methods and Apparatus for Controlling Fluid-Supply Pressures, of which the following is a specification.

The hereinafter described invention is more particularly designed for use in connection with governor controlled fluid actuated means for regulating an impact stream issuing from a hydraulic nozzle relative to a driven hydraulic motor, as for instance a tangential water wheel, for proportioning the water quantity of the issuing impact stream in accordance with changes in the working load placed onto the said motor.

The pressure fluid employed in conjunction with the governor controlled fluid actuated mechanism for hydraulic plants is oil, which, as admitted into a pressure cylinder, acts against a pilot piston located therein for imparting travel or movement thereto to shift its position for placing into operation the means for controlling the water quantity, relative to the driven motor. Heretofore, the practice has been to provide a tank or reservoir for the oil, suitably connected to permit of oil under pressure flowing from said reservoir in advance of and back of the piston respectively, in response to a call on the part of the governor for the placing of an increase or a decrease in the water quantity, the discharge or utilized oil from the pressure cylinder of the fluid actuated piston being returned to a sump or well. Somewhere in the system, generally between the tank or reservoir and the sump for the discharged fluid oil, is located a circulating pump, driven from any suitable source of supply, which takes the oil from the sump or well and returns the same to the tank or reservoir, when the pressure therein has fallen below its maximum pressure, but, in case the oil in said tank or reservoir is at maximum pressure or when such pressure has been restored, by means of a valved connection situated within the pipe system, provision is made for by-passing the oil raised by the circulating pump, and maintaining the same in constant and rapid circulation under pressure. Inasmuch as all the oil in the tank or reservoir is sooner or later discharged therefrom to actuate the piston, and when utilized discharged from the cylinder thereof into the sump and returned by the continuously operating pump to the tank or reservoir, it is apparent that sooner or later all of the fluid oil is subjected to rapid circulating movement when by-passed from the pump. This constant circulation of the oil at high speed and under pressure, raises the temperature thereof to a high degree of heat and quickly destroys the life and efficiency of the oil as a fluid actuating medium, rendering the same limpid and weakened to such an extent as to destroy its vitality and usefulness as a medium for quickly, positively, and effectively shifting the position of the fluid controlled piston for regulating the water quantity relative to the driven motor, in response to sudden changes in the working load placed thereon. As a result of this breaking down of the circulating oil and its impairment as a pressure medium, it is required that at comparatively short intervals the fluid oil be withdrawn and replenished with a fresh supply of oil, which not only is a source of expense, but necessitates the shutting down of the hydraulic unit controlled thereby until such a change has been made. The constant, steady and uniform operation of the plant is thus interfered with, resulting in a lowering of the power output of the hydraulic station; which is a serious question, where the plant is utilized for the generating of electricity for general distribution for power and electric lighting purposes.

The object of the present invention is to hold the fluid pressure oil under a constant and maximum head pressure of a predetermined number of pounds, and to maintain the oil and its supply mechanism at a state of rest, except at such times as the fluid oil is placed into action for shifting the fluid actuated piston and the supply mechanism thrown into operation for raising the fluid oil from the sump or well and delivering the same into the pressure tank for maintenance of the head pressure; on a lowering thereof, due to withdrawal of oil therefrom under pressure for operating the said piston. By thus holding the fluid oil under constant pressure and normally in a quiescent condition, the said fluid oil is made responsive to the slightest call on the part of the governor mechanism, and the full life, strength, and efficiency of the fluid oil is preserved.

The method of controlling the fluid oil supply pressure for actuating the fluid controlled piston in accordance with varying speed changes of the governor mechanism, consists in maintaining a body of the fluid oil within a tank or reservoir under an established maximum pressure, connecting with said pressure tank or reservoir, by means of suitable pressure actuated mechanism, a body of oil within a sump or well, permitting the fluid oil confined under pressure to flow from the pressure tank or reservoir for actuating the fluid pressure controlled piston on a shifting of the governing mechanism, due to a change in the speed of the driven motor, returning the utilized or waste fluid oil discharged from either end of the cylinder for the said piston into the sump or well, supplying to the pressure tank or reservoir from said sump or well, through the action of the pressure actuated mechanism, such oil as may be required to restore the oil pressure therein, reduced by the withdrawal of oil therefrom, and thence bringing the fluid oil to a state of rest and so maintaining the same until thrown into action by a call of the governing mechanism to operate the fluid actuated piston and restore pressure within the pressure tank or reservoir.

To comprehend the invention reference should be had to the accompanying sheet of drawings, wherein is illustrated diagrammatically its application to the actuating mechanism for controlling the water quantity of an issuing impact stream relative to a tangential water wheel, the various cylinders through which pressure fluid passes being in section.

In the drawings, the numeral 1 is used to designate any suitable form of a nozzle for directing an impact stream 2 relative to a driven hydraulic motor 3. In the present case, the nozzle is illustrated as deflectably connected to a pipe line 3', by a swinging joint 4. The movement of deflection of the nozzle 1 is controlled by a fluid actuated piston 5, working within a pressure cylinder 6, the stem 7 of the said piston being connected by a link 7' to one arm of a crank lever 8, the opposite arm of which is connected to the outer end portion of the said nozzle 1.

Fluid oil under pressure is held within the tank or reservoir 9, which fluid oil is conveyed to the inlet port 10 of the cylinder 11 by means of the pipe connection 12. Within the said cylinder 11 works the pilot valve 12', which controls the cylinder ports 13 and 13'. The stem 14 of this valve is connected by the fulcrumed lever $14^2$ to the fly-balls 14' of the governor, and is raised and lowered with the increased and decreased speed thereof, as usual in such cases. From the cylinder ports 13 and 13', respectively, lead the pipes 15 and 15', which connect with the inlet ports 16 and 16', of the pressure cylinder 6, for admitting fluid under pressure in advance of and back of the piston 5 working in said cylinder.

At any suitable point is located a sump or well 17 for receiving the utilized or waste fluid oil discharged from the cylinder 11, which sump or well is connected to the said cylinder 11 by means of the discharge pipe 17' extended from the lower end thereof, and with which pipe communication is had with the upper discharge 18 of the cylinder 11 by the passage-way 18'.

Within the pipe connection 19 between the pressure tank or reservoir and the sump or well 17, is interposed a hydraulic piston pump 20, preferably of the duplex type, which supplies oil from the sump or well to the said pressure tank or reservoir 9 on the oil therein falling below a maximum or given pressure, the pumping action of said piston pump ceasing on the oil within the said pressure tank or reservoir being restored to its normal or maximum pressure. A lowering of the established pressure for the operating fluid is thus provided against, so that a constant head pressure for the fluid oil is maintained at all times, although the circulation of oil between the sump or well 17 and the pressure tank or reservoir 9 is only placed into action on a reduction in the pressure within the said pressure tank or reservoir, the fluid oil at other times remaining at a state of rest.

The pressure for operating the hydraulic piston pump 20 is preferably taken from the pipe line 3' by means of the branch connection 20' leading therefrom. This piston pump operates in the usual well known manner, a description of which is not deemed essential for an understanding thereof.

The controlling of the speed of water wheels, turbines, or other hydraulic motors by a governor under normal load conditions does not require that the fluid actuated piston 5 travel back and forth continuously, but does, at sudden load change conditions, require one or two quick strokes. Therefore, the oil under pressure which throws into operation the said piston is not required in a steady, continuous stream, but at times a large amount is needed instantly, and at other times, for perhaps a period of several minutes, practically no oil is required as the speed is normal and the governor is at rest. However, the pressure of the oil should at all times be within certain limits, so as to be responsive to the slightest call by or fluctuation of the governor.

As stated, the duplex piston pump 20 is arranged to take oil from the sump or well 17 and force the same into the pressure tank or reservoir 9 on a lowering of the pressure therein, so as to reëstablish and maintain a maximum pressure therein of a predetermined number of pounds, as for instance, 180 pounds. The water and oil cylinders of the said pump are so proportioned that the available pressure in the water cylinders obtained from the main line pipe through the branch connection 20' (or from some auxiliary supply) will produce exactly the maximum pressure in the oil cylinders that is required for operating the governor controlled mechanism. Just so long as the pressure in the oil cylinders is less than this maximum pressure the pump will operate for the forcing of oil from the sump or well into the pressure tank or reservoir, but the moment the maximum pressure is reached the pump will cease running and all oil fluid be brought to a state of rest.

Within the pressure tank or receiver 9 is imprisoned an air bubble, which may be maintained by a small air compressor 22, driven in any suitable manner. The connection 12 leads from the bottom of the pressure tank or reservoir and the air bubble being trapped within the upper portion of the said tank or reservoir acts against the surface of the oil confined therein. Thus, when oil fluid under pressure is called for by a shifting of the governor to actuate the piston 5 for operating the controlling means for the impact stream, the same is delivered instantly by the expansion of the air bubble in the pressure tank or reservoir 9. As soon as the pressure in said tank or reservoir shows any perceptible drop or lowering, the pump 20 is automatically placed into commission to raise oil from within the sump or well 17 and force the same under pressure into the tank or reservoir 9 for reëstablishing the maximum pressure therein.

In operation, presuming the working load on the driven motor to suddenly lower for any reason whatever, the speed of the governor instantly increases, which actuates the lever 14² to lower the valve stem 14 and the pilot valve 12' to uncover the cylinder port 13', permitting oil fluid under pressure to flow through the connection 15' into the cylinder 6 back of the piston 5. The pressure of the oil fluid thus admitted forces outwardly the said piston and through its described connection raises the nozzle 1 until the water quantity of the impact stream 2 impinging onto the hydraulic motor or tangential water wheel 3 is proportioned to the working load requirement placed thereon, thus bringing the governor to normal speed. During this outward movement of the piston 5, such oil as is contained in the cylinder 6 in advance thereof is expelled through the port 16 and pipe connection 15 into the cylinder 11 above the pilot valve 12', the same flowing from said cylinder and through the discharge pipe 17' into the sump or well 17. Should the fluid oil withdrawn from the pressure tank or reservoir 9 cause a lowering of the pressure therein below the established maximum pressure, the piston pump 20 will automatically come into operation and, sucking oil from the sump or well 17 will force same into the tank or reservoir 9 until a reëstablishment of the maximum pressure is attained, when the operation of the pump for the forcing of oil into the said tank will cease and the fluid oil be brought to a state of rest. On a lowering in the speed of the governor mechanism, a reverse operation to that described takes place, the fluid pressure oil being admitted to the cylinder 6 in advance of the piston 5 for forcing the same inwardly, and through its described connection lowering the deflectable nozzle 1 to decrease the water quantity of the issuing impact stream relative to the driven motor proportionately to the working load thereon.

While the invention has been described in connection with hydraulic motors of the water wheel type, it is apparent that its use is applicable to any form of fluid controlled mechanism which requires pressure oil as the medium for placing into operation such controlled mechanism.

The feature of the invention is the maintenance of the fluid oil in a quiescent condition, except at such times as called into action for operating the pressure controlled piston and reëstablishing a lowering of the maximum pressure within the pressure tank or reservoir, and by so doing overcoming the overheating of the fluid oil and the breaking down of the same by reason of rapid circulation under pressure when not being employed in response to a call for actuating the fluid controlled mechanism. The life, efficiency, and energy of the fluid oil is thus preserved as a medium for actuating the fluid controlled mechanism, which is of the utmost importance in connection with power machinery required to be held in tension under all working conditions and responsive to quick and sudden changes in the operating mechanism.

Having thus described the invention what is claimed as new and desired to be secured by Letters Patent is—

1. An apparatus for the described purpose, the same comprising a piston motor, a cylinder having valve controlled ports, a valve within said cylinder, connections between the cylinder and motor, governing mechanism, connection between the same and the valve of the cylinder, a reservoir containing fluid oil under an established pressure, connection between said reservoir and the cylinder for admitting the flow of fluid oil therethrough on the shifting of the valve therein on a change in the speed of the governing mechanism, means for receiving the fluid oil discharged from the controlling mechanism, and fluid actuated mechanism automatically thrown into action for restoring such oil to the fluid oil reservoir on the oil therein falling below an established pressure, the oil at other times remaining at a state of rest on the governing mechanism being restored to normal speed and so held until a subsequent change in the speed of the governing mechanism.

2. In an apparatus for the described purpose, the combination with the controlling means for regulating the issuing impact stream relative to a driven motor, a reservoir containing fluid oil under pressure, a conduit interposed between the reservoir and the controlling means for the passage of fluid from the reservoir to said controlling means for actuating the latter, a sump having a connection with said controlling means for receiving the fluid oil discharged from the said controlling means, connection between said sump and the reservoir, and fluid actuated mechanism interposed within said connection and automatically thrown into action for restoring oil from the sump to the reservoir only on the fluid oil therein falling below an established pressure.

3. In an apparatus for the described purpose, the combination of a controlling piston, a cylinder therefor, a tank for containing fluid under pressure, means for maintaining an established pressure in the tank, a connection between the cylinder and tank, governor controlled mechanism constructed and arranged to control the flow of fluid from said tank through said connection to the piston cylinder, and means operatively connected with the tank and controlled by the pressure within said tank for returning the fluid at intervals only back into the tank.

4. In an apparatus for the described purpose, the combination of a controlling piston cylinder, a fluid pressure reservoir, a governor for controlling the flow of fluid from the reservoir to the cylinder, a sump for receiving the discharged fluid from the cylinder, a pump for returning the fluid from the sump to the reservoir under pressure, and mechanism governed by the pressure in the reservoir constructed and arranged to alternately operate the pump and maintain the same at a state of rest in accordance with the movement of the governor.

5. In an apparatus for the described purpose, the combination of a cylinder having valve controlled ports, a valve in said cylinder, a fluid pressure reservoir, a conduit interposed between the reservoir and cylinder, a governor for controlling the flow of fluid from the reservoir through said conduit to the cylinder, a sump having a conduit for establishing connection with the cylinder for receiving the discharged fluid from the cylinder, means whereby said discharged oil normally remains at a state of rest in said sump and means acting according to the pressure in the reservoir for periodically replenishing the reservoir with the discharged oil in said sump.

6. In an apparatus for the described purpose, the combination of a controlling piston cylinder, a fluid pressure reservoir, a governor for controlling the flow of fluid from the reservoir to the cylinder, a sump for receiving the discharged fluid from the cylinder, a pump for returning the fluid from the sump to the reservoir under pressure, and means for alternately operating the pump and maintaining the same at a state of rest, the pump operating to restore the oil to the reservoir on the oil therein falling below an established pressure.

7. In an apparatus for the described purpose, the combination of a fluid pressure reservoir, a piston cylinder, a conduit between the reservoir and cylinder, a sump having a connection with the cylinder whereby to receive the discharge from said cylinder, a conduit leading from the reservoir to the sump, and a pump interposed in the last mentioned conduit and means associated with the pump for operating the same to remove the fluid from the sump and into the reservoir only on the pressure in the reservoir falling below an established pressure.

8. In an apparatus for the described purpose, the combination of an oil reservoir, a piston cylinder, a conduit between the reservoir and cylinder, a sump to receive the discharge from said cylinder, a conduit leading from the reservoir to the sump, and a pump interposed in the last mentioned conduit, mechanism operatively associated with the tank constructed and arranged to remove the oil from the sump and into the reservoir only on the pressure in the reservoir falling below an established pressure and governor mechanism interposed in the conduit leading from the reservoir to the cylinder.

9. An apparatus of the character stated comprising a governor, a reservoir for fluid, means for maintaining a body of fluid in the reservoir under an established pressure, means for causing the discharge of oil from the reservoir in accordance with the movement of a governor, a receptacle to receive the discharged oil, means for maintaining the discharged oil at a stage of rest in said receptacle while the governor is at a state of rest, a return conduit and mechanism controlled by the pressure in the reservoir for finally forcing under pressure the discharged oil from the receptacle through the return conduit back into the reservoir when the governor moves from its state of rest.

10. In an apparatus of the character described, the combination of a governor, a cylinder having a piston operatively connected to the governor to actuate on a change in the speed of the governor, a receptacle for containing a body of actuating fluid oil having connection with the cylinder, means associated with the governor for permitting portions of said fluid oil to pass out of the receptacle through the connection into the cylinder in accordance with the changes in the speed in the governor mechanism, a sump between the cylinder and receptacle for receiving the waste or discharged oil, and means for cutting off the flow of the pressure circulating fluid oil and bringing the same to a positive state of rest on the governor mechanism being restored to normal speed, and associated means for automatically restoring oil into the receptacle from said sump on the oil in the receptacle falling below an established pressure.

11. In an apparatus of the character stated, a reservoir, means for maintaining a body of fluid oil in the reservoir under an established pressure, a cylinder, means for causing a discharge of the oil from the reservoir to the cylinder, and from the cylinder to an auxiliary receptacle, the said receptacle, means for causing said oil to remain in said receptacle at a state of rest, and means for subsequently forcing said discharged oil back into the reservoir.

In testimony whereof I have signed my name to this specification in the presence of two subscribing witnesses.

GEORGE J. HENRY, Jr.

Witnesses:
N. A. ACKER,
D. B. RICHARDS.